3,470,259
**DEALKYLATION OF DITERTIARY-
BUTYLCRESOLS**
Gerd Leston, Pittsburgh, Pa., assignor to Koppers
Company, Inc., a corporation of Delaware
No Drawing. Filed Feb. 17, 1966, Ser. No. 528,066
The portion of the term of the patent subsequent to
Oct. 10, 1984, has been disclaimed and dedicated
to the Public
Int. Cl. C07c 39/18, 39/12
U.S. Cl. 260—621                       11 Claims

ABSTRACT OF THE DISCLOSURE

The dealkylation of ortho-, para-ditertiary-alkyl-metacresols to give substantially quantitative yields of metacresol is carried out by heating the ortho-, para-ditertiary-alkyl-metacresols in the presence of a catalytic amount of an aryloxide of a metal selected from zirconium, niobium, hafnium and tantalum, until about two moles of isoolefin are evolved.

---

This invention relates to the dealkylation of tertiary-alkylated phenols. Specifically, it relates to the dealkylation of ortho-, para-ditertiary-alkylated metacresols. In another aspect, it relates to the preparation of metacresol by the dealkylation of tertiary-alkylated metacresols.

The meta- and para-isomers of cresol, since these isomers differ only in about 0.8° C. in their boiling points, are not separable by fractional distillation. It has therefore been the practice to separate the cresol isomers by use of an alkylation-dealkylation technique. Upon alkylation of a commercial mixture of meta- and paracresol, with branch chained olefins such as isobutylene, there is obtained a mixture of ditertiary-butyl-metacresol and ditertiary-butyl-paracresol. These alkylated materials are readily separated by fractional distillation and may be subsequently dealkylated to give pure meta- and paracresols.

Thermal dealkylation of the ditertiary-alkylphenols is inefficient because of accompanying side reactions and the use of a catalyst for dealkylation is highly preferable. Prior art catalysts for such dealkylations have included strong acidic catalysts such as sulfuric acid, aluminum chloride, aluminum chloride-organic adducts, aluminum-phenolic adducts, tetraphosphoric acid, and the like for liquid phase dealkylation.

Liquid phase dealkylations are preferable because they do not require the high temperatures (in the range of 350–550° C.), expensive equipment, and regeneration facilities necessary when vapor phase dealkylations are performed.

I have found that surprisingly the aryloxides of metals of the fifth and sixth periods of Group IV-B and Group V-B of the Periodic Table are excellently suited as catalysts in a process for the dealkylation of ortho-para-ditertiary-alkyl-metacresols to obtain substantially quantitative yields of metacresol. The branched chain olefin obtained as a coproduct of my method is substantially pure and little or no polymerization thereof occurs during the dealkylation.

It is therefore an object of my invention to provide a new and economical dealkylation process whereby relatively pure metacresol and an isoolefin are obtained as coproducts in substantially quantitative yields.

In accordance with the invention, ortho-, para-ditertiary-alkyl-metacresols are dealkylated by heating an ortho-, para-ditertiary-alkyl-metacresol in the presence of a catalytic amount of an aryloxide of a metal of the fifth and sixth periods of the Group IV-B and Group V-B metals until dealkylation occurs. The metacresol from which the tertiary-alkyl groups have been removed is then recovered from the reaction mixture. The term dealkylation as used herein, means an operation in which tertiary-alkyl groups are split off from the alkylated cresol without removal of the methyl group.

The metals of the fifth and sixth periods of the Group IV-B and V-B elements usable in the present invention are zirconium, niobium, hafnium, and tantalum. These metals are classified according to their appearance in the Periodic Table of Elements, E. H. Sargent & Company, S-18806, Catalogue No. 113, 1964.

The starting material for the process of my invention is an ortho-, para-ditertiary-alkyl-metacresol, such as 4,6-ditertiary-butyl-metacresol or 4,6-ditertiary-amyl-metacresol. These materials are commonly prepared in alkylation processes for the separation of meta- and paracresol isomers.

The catalyst used in the invention is an aryloxide of the fifth and sixth periods of the Group IV-B and V-B metals, such as the phenoxides and toloxides of zirconium, hafnium, niobium, and tantalum. The catalysts are readily prepared by reacting the desired metal, metahydroxide, metal-alkoxide or metal chloride with a phenol or alkylated phenol. For convenience, the phenol used in the formation of the metal-aryloxide is that being subjected to dealkylation and the process of the invention or one of those which is obtained as a dealkylation product. Thus, the preferred metal-aryloxide for the dealkylation of an ortho-, para-ditertiary-butyl-metacresol or an ortho-, para-ditertiary-amyl-metacresol is a zirconium, hafnium, niobium, or tantalum m-toloxide.

The catalyst may be preformed or it may be formed in situ. To preform the catalyst substantially stoichiometric quantities of zirconium, hafnium, niobium or tantalum chloride and the desired phenol, e.g., phenol, metacresol, paracresol, or various alkylated phenols and cresols, e.g., 2,4-xylenols, are heated together at an elevated temperature of, for example, 60–250° C. As I have noted hereabove, the metal alkoxides or metal hydroxides can be used in place of the zirconium, niobium, hafnium or tantalum halide to form the metal aryloxide. The preformed catalyst is conveniently prepared in an aromatic solvent, such as toluene, xylene, and the like. The catalyst is formed in situ by adding sufficient quantities of the zirconium, hafnium, niobium or tantalum compound and the phenol to the reaction mixture prior to dealkylation. If the catalyst used is the aryloxide of the phenol to be dealkylated or the aryloxide of one of the products of dealkylation, it is necessary simply to add a sufficient quantity of zirconium, niobium, hafnium, or tantalum halide (or other such metal compound) to the reaction mixture.

The amount of catalyst used generally ranges between about 0.005 and 5 mole percent, based on the number of moles of the material to be dealkylated, although the preferred amount of catalyst varies to some extent with the conditions of dealkylation. If less than 0.005 mole percent of catalyst is used, dealkylation is quite slow. For economic reasons no advantage is seen in using greater than about 5 mole percent catalyst, although no adverse effects are obtained thereby. Best results are obtained using 0.05 to 2 mole percent catalyst.

The reaction is highly endothermic. In the presence of large amounts of catalysts, that is to say greater than about one percent by weight, dealkylation proceeds rapidly and it is difficult to maintain the reaction temperature in the upper portion of the necessary temperature range. The reaction temperatures in my method range between 150° C. and 275° C. Below about 150° C. dealkylation is very slow and above about 275° C. it is not possible to operate in the liquid phase without the use of substantial positive pressure and the recovery of the coproduct isoolefin is more difficult.

It is advantageous to conduct the dealkylation at atmospheric pressure. Subatmospheric or superatmospheric pressures are usable but are not preferred. The use of atmospheric pressure enables ready condensation or recovery of the evolved olefin and facilitates continuous operation. Slight positive pressures of about 30–60 p.s.i. are sometimes helpful to reduce the size of equipment and dispense with the use of refrigeration to liquefy and separate the evolved olefin. Reduced pressures can be used if it is desired to flash off the metacresol formed during the reaction but such pressures make the recovery of the coproduct isoolefin more difficult.

The reaction time for my process is readily determined by measuring the amount of isoolefin evolved from the reaction mixture. After the removal of approximately two moles of isoolefin for each mole of starting ortho-, para-ditertiary-alkyl-metacresol the reaction is stopped.

In recovering the metacresol product, the reaction mixture may be fractionally distilled or flash distilled followed by a fractional distillation. The distillation may also be carried out concurrently with the dealkylation, or the bulk of the reaction product can be removed in crude form by simple distillation and purified by subsequent fractional distillation.

A continuous process may be used in which fresh ditertiary-alkyl-metacresol is continuously fed to the reaction mixture as the dealkylation takes place. In a batch operation, after removal of the product, the catalyst may be recycled for use in a subsequent run.

My invention is further illustrated by the following examples.

EXAMPLE I

In a flask equipped with a reflux condenser, stirrer and thermometer, the catalyst was preformed by refluxing 14 g. of dried and redistilled metacresol with 1.1 g. of zirconium tetrachloride under a stream of nitrogen for 20 hours. To the catalyst mixture was added 110 g. (0.5 mole) of redistilled 4,6-ditertiary-butyl-metacresol (0.01 mole catalyst per mole of 4,6-ditertiary-butyl-metacresol) and a sample (Sample 1) taken. The mixture was heated to reflux with stirring. The mixture was refluxed (maximum temperature 216° C.) and stirred for a period of 4.5 hours, until no more gas was evolved. The product was sampled (Sample 2). Both samples were analyzed by vapor phase chromatography.

The results follow:

| Compound | Sample 1 | Sample 2 |
|---|---|---|
| | Area percent | |
| Metacresol | 10.4 | 97.4 |
| 4,6-ditertiary-butyl-metacresol | 87.2 | 0.5 |
| 2,6-ditertiary-butyl-paracresol | 2.2 | |
| 2-tertiary-butyl-5-methylphenol | 0.2 | 1.3 |
| 2-tertiary-butyl-4-methylphenol | | 0.2 |

EXAMPLE II

The apparatus used in Example I was charged with 14 g. of dried and redistilled metacresol and 1.5 g. of hafnium tetrachloride. The mixture was refluxed 22 hours under a stream of nitrogen. To the catalyst mixture was added 110 g. (0.5 mole) of redistilled 4,6-ditertiary-butyl-metacresol (0.01 mole of catalyst per mole of 4,6-ditertiary-butyl-metacresol) and a sample (Sample 1) taken. After refluxing the stirred mixture for 4.5 hours (maximum temperature 205° C.), no more gas being evolved, the mixture was sampled (Sample 2). Analysis by vapor phase chromatography gave the following results:

| Compound | Sample 1 | Sample 2 |
|---|---|---|
| | Area percent | |
| Metacresol | 10.9 | 93.0 |
| 4,6-ditertiary-butyl-metacresol | 86.8 | 0.4 |
| 2,6-ditertiary-butyl-paracresol | 2.4 | Trace |
| 2-tertiary-butyl-5-methylphenol | 0.2 | 5.8 |
| 2-tertiary-butyl-4-methylphenol | | 0.2 |

EXAMPLE III

A flask was charged with 14 grams of dried and redistilled metacresol and 0.9 gram of tantalum tetrachloride. Refluxing of the mixture was carried out for 21 hours under a stream of nitrogen. To the catalyst mixture was added 110 grams (0.5 mole) of redistilled 4,6-ditertiary-butyl-metacresol (0.005 mole of catalyst per mole of 4,6-ditertiary-butyl-metacresol) and a sample (Sample 1) was taken. The mixture was then refluxed for 5.5 hours (gas evolution ceased), and the product sampled (Sample 2). The samples analyzed:

| Compound | Sample 1 | Sample 2 |
|---|---|---|
| | Area percent | |
| Metacresol | 10.6 | 95.7 |
| 4,6-ditertiary-butyl-metacresol | 87.2 | 0.8 |
| 2,6-ditertiary-butyl-paracresol | 2.2 | Trace |
| 2-tertiary-butyl-5-methylphenol | | 3.0 |
| 2-tertiary-butyl-4-methylphenol | | 0.3 |

EXAMPLE IV

The procedure of Example I was followed except that niobium pentachloride was used to prepare the catalyst. The niobium toloxide catalyst was refluxed with the 4,6-ditertiary-butyl-metacresol and the results obtained were substantially the same as those of Example I, with an excellent yield of metacresol being produced.

The surprising nature of the dealkylating ability of the metals of the fifth and sixth periods of the Group IV–B and Group V–B elements is evidenced by the failure of the fourth period members of these groups, titanium and vanadium, when attempts are made to use them as dealkylation catalysts.

EXAMPLE V

A 1000 ml. flask equipped with stirrer, reflux condenser and thermometer, was charged with 504 g. of 4,6-ditertiary-butyl-metacresol and a catalyst prepared (as in previous examples) from 5 g. of metacresol and 2.0 g. of tetraisopropyl titanate. The mixture was refluxed (maximum temperature 239° C.) for 28 hours and a sample (Sample 1) taken. Additional tetraisopropyl titanate, 2.0 g. was added and the refluxing resumed until the total time reached 57.5 hours, and a second sample (Sample 2) taken. The samples analyzed:

| Compound | Sample 1 | Sample 2 |
|---|---|---|
| | Area percent | |
| Metacresol | 13 | 35 |
| 4,6-ditertiary-butyl-metacresol | 27 | 7 |
| 2-tertiary-butyl-5-methylphenol | 44 | 44 |
| 3-methyl-4-tertiary-butylphenol | 16 | 14 |

EXAMPLE VI

The procedure employed in Example I was followed except that the catalyst was formed from titanium tetrachloride on metacresol and the reflux time of the reaction mixture was 43 hours. The product analyzed as follows:

13 percent metacresol,
25 percent 4,6-ditertiary-butyl-metacresol,
36 percent 2-tertiary-butyl-5-methylphenol, and
17 percent 3-methyl-4-tertiary-butylphenol.

The two preceding examples clearly illustrate the failure of titanium to totally dealkylate a dibutylated cresol. Even at reflux times in excess of 40 hours, only poor yields of metacresol were formed.

EXAMPLE VII

The procedure of Example I was followed except that vanadium trichloride was used to preform the catalyst. The reaction mixture was refluxed (250° C.) and samples taken after one hour (Sample 1) and 7.5 hours (Sample 2). Analysis of the reaction product follows:

| Compound | Sample 1 | Sample 2 |
|---|---|---|
| | Area percent | |
| Metacresol | 13 | 13 |
| 4,6-ditertiary-butyl-metacresol | 85.0 | 80.2 |
| 2-tertiary-butyl-5-methylphenol | 1.7 | 3.5 |
| 3-methyl-4-tertiary-butylphenol | 0.2 | 3.2 |

These results show the failure of a vanadium catalyst to dealkylate and also point out the exceptional utility of the specific metals of the fifth and sixth periods of the Group IV-B and Group V-B elements in total dealkylation of ditertiary-butylated cresols.

I claim:
1. Process for dealkylating ortho-, para-ditertiary-alkyl-metacresols comprising:
heating an ortho-, para-ditertiary-alkyl-metacresol at an elevated temperature in the presence of a catalytic amount of an aryloxide of a metal selected from the group consisting of the fifth and sixth periods of the Group IV-B and Group V-B metals of the Periodic Table until about two moles of isoolefin per mole of said ortho-, para-ditertiary-alkyl-metacresol are evolved.

2. The process of claim 1 wherein said elevated temperature is between 150° C. to 275° C.
3. Process for preparing metacresol comprising
heating an ortho-, para-ditertiary-alkyl-metacresol at a temperature of 150° C. to 275° C. in the presence of an aryloxide of a metal selected from the group consisting of the fifth and sixth periods of the Group IV-B and Group V-B metals of the Periodic Table until about two moles of isoolefin per mole of ortho-, para-ditertiary-alkyl-metacresol is evolved, and
recovering metacresol from the mixture.
4. The process of claim 3 wherein the aryloxide is a phenoxide.
5. The process of claim 3 wherein the aryloxide is a toloxide.
6. The process of claim 3 wherein the said isoolefin is recovered.
7. The process of claim 3 wherein said ortho-, para-ditertiary-alkyl-metacresol is 4,6-ditertiary-butyl-metacresol.
8. The process of claim 3 wherein said metal is hafnium.
9. The process of claim 3 wherein said metal is niobium.
10. The process of claim 3 wherein said metal is zirconium.
11. The process of claim 3 wherein said metal is tantalum.

References Cited

UNITED STATES PATENTS

| 2,444,545 | 7/1948 | Thomas | 260—672 |
| 3,091,646 | 8/1963 | Leston | 260—624 |
| 3,151,176 | 8/1964 | Flanders | 260—672 |
| 3,197,523 | 7/1965 | Michalko et al. | 260—672 |

BERNARD HELFIN, Primary Examiner

W. B. LONE, Assistant Examiner

U.S. Cl. X.R.

252—431, 461; 260—624